United States Patent
Hunacek et al.

(10) Patent No.: US 9,563,769 B2
(45) Date of Patent: Feb. 7, 2017

(54) SYSTEM AND METHOD FOR SECURE LOADING DATA IN A CACHE MEMORY

(71) Applicant: Nagravision SA, Cheseaux-sur-Lausanne (CH)

(72) Inventors: Didier Hunacek, Blonay (CH); Marco Macchetti, Cheseaux-sur-Lausanne (CH); Patrick Servet, Ollon (CH)

(73) Assignee: NAGRAVISION S.A., Cheseaux-sur-Lausanne (CH)

( * ) Notice: Subject to any disclaimer, the term of this patent is extended or adjusted under 35 U.S.C. 154(b) by 86 days.

(21) Appl. No.: 14/735,825

(22) Filed: Jun. 10, 2015

(65) Prior Publication Data

US 2015/0363594 A1 Dec. 17, 2015

(30) Foreign Application Priority Data

Jun. 12, 2014 (EP) ..................................... 14172217

(51) Int. Cl.
| | |
|---|---|
| *G06F 11/00* | (2006.01) |
| *G06F 21/51* | (2013.01) |
| *H04L 9/32* | (2006.01) |
| *H04L 9/06* | (2006.01) |
| *G06F 21/64* | (2013.01) |
| *G06F 21/74* | (2013.01) |

(52) U.S. Cl.
CPC ............... *G06F 21/51* (2013.01); *G06F 21/64* (2013.01); *G06F 21/74* (2013.01); *H04L 9/0643* (2013.01); *H04L 9/32* (2013.01); *G06F 2221/034* (2013.01)

(58) Field of Classification Search
CPC ............. G06F 21/51; G06F 21/74; H04L 9/32

USPC .......................................................... 726/22
See application file for complete search history.

(56) References Cited

U.S. PATENT DOCUMENTS

| | | | |
|---|---|---|---|
| 4,309,569 A | 1/1982 | Merkle | |
| 8,719,580 B2* | 5/2014 | Frey | G06F 12/1408 713/181 |
| 2003/0037220 A1 | 2/2003 | Anvin et al. | |
| 2008/0172562 A1* | 7/2008 | Cachin | G06F 12/1408 713/193 |

(Continued)

OTHER PUBLICATIONS

European Search Report issued in European Application No. 14 17 2217 dated Sep. 9, 2014.

(Continued)

*Primary Examiner* — Dede Zecher
*Assistant Examiner* — Dereena Cattungal
(74) *Attorney, Agent, or Firm* — DLA Piper LLP (US)

(57) ABSTRACT

A system and method for securely loading data in a cache memory associated with at least one secure processor that performs data processing by using at least one untrusted external memory storing data to be processed, at least one secure internal cache memory to load or store data, and at least one secure cache translator operating as a memory management unit. The secure cache translator stores, into a secure cache digest table, parameters arranged on persistent and variable data pages. The parameters comprise at least a root digest based on node digests calculated on at least one persistent data page according to a Merkle tree structure. The integrity of the data pages is verified during transfers between the secure internal cache memory and the external memory by comparing a calculated root digest with the root digest stored in the secure cache digest table.

13 Claims, 5 Drawing Sheets

(56) References Cited

U.S. PATENT DOCUMENTS

| | | | |
|---|---|---|---|
| 2010/0153732 A1 | 6/2010 | Su | |
| 2010/0228999 A1* | 9/2010 | Maheshwari | G06F 21/6218 713/189 |
| 2015/0370728 A1* | 12/2015 | Yamada | G06F 12/1416 711/163 |
| 2016/0246736 A1* | 8/2016 | Lee | G06F 21/72 |

OTHER PUBLICATIONS

G. Edward Suh et al., "The AEGIS Processor Architecture for Tamper-Evident and Tamper-Resistant Processing", MIT-LCS-TR-883, Jan. 28, 2003 (19 pages).

Blaise Gassend et al., "Caches and Hash Tress for Efficient Memory Integrity Verification", Proceedings of the Ninth International Symposium on High-Performance Computer Architecture (HPCA-9'03), pp. 295-306, Feb. 8, 2003.

Marten Van Dijk et al., "Offline Untrusted Storage with Immediate Detection of Forking and Replay Attacks", Proceedings of the 2007 ACM Workshop on Scalable Trusted Computing (STC'07), pp. 41-48, Nov. 2, 2007.

\* cited by examiner

SYSTEM AND METHOD FOR SECURE LOADING DATA IN A CACHE MEMORY

CROSS-REFERENCE TO RELATED APPLICATION

This application claims the benefit of European Application No. 14172217.3 filed Jun. 12, 2014.

FIELD OF THE INVENTION

The present invention relates to security of computers or systems on chip or other data processing systems comprising processors, in particular it aims to guarantee a secure loading of digital data or programs in a secure working volatile memory from an unsecure environment towards a secure environment

TECHNICAL BACKGROUND

A data processing system comprises in general hardware components such as one or more processors, volatile memories RAM (Random Access Memory), cache memories, non volatile writable memories (flash, disks, etc.) and non-volatile read-only memories ROM (Read Only Memory). The data processing system operates in most of the cases under control of an operating system by executing program instructions by using one or more software resources or applications. The applications may be stored in a non-volatile memory and loaded into a volatile memory during execution when required. During execution of an application, the data required by the application or data which is produced by the application may be stored in the non-volatile memory or volatile memory or transferred from one memory to another.

With the advent of multiple connectivity options for data processing systems, including wireless connectivity, and with the huge growth in the use of mobile data processing systems, the need to protect these systems from malicious attacks has become increasingly important. Malicious attacks can be aimed at interfering with system booting, modifying the operating system, intercepting and/or modifying data produced by or utilized by some application.

In fact, it has now become a necessary requirement to protect data processing systems against fraudulent manipulations and attacks on their integrity. Such malicious attacks may come in the form of software designed to take over a data processing system's operating system or otherwise interfere with the normal processing sequence of the data processing system without the user's knowledge or approval. Such software is generally known as malware. The presence of malware in a data processing system is generally difficult to remedy and can lead to complete system failure or even to irreparable damage to the system.

Computer viruses, worms, Trojan horses, spyware etc. are all different types of malware. The different types of malware can attack the processing system in various ways such as by intercepting data which was meant for another application or by monitoring key strokes in order to steal passwords or other information which is meant to be kept secret, modifying or otherwise altering data or corrupting files, modifying a program in order to cause it to crash or to execute some function which was not originally intended by the user.

Systems to combat against malware attacks exist and generally use a memory management unit, which is configurable by the system's processor or secure processors provided with access control modules. Because of the increasing complexity of the processors, the additional security functions which would be required in order to minimize the possibility of such malware attacks would lead to a significant cost increase in terms of the extra on-chip real estate necessary to implement such functions and would lead to computing overhead and therefore compromise the speed of operation. Therefore, it would be desirable to have a cost-efficient and size-efficient solution providing secure management of data or applications loading or unloading into or out of memories in a data processing system.

Some solutions exist such as, for example, the one disclosed in document U.S. Pat. No. 5,825,878, where an integrated secured memory management unit is used by a microprocessor for transferring encrypted data and instructions from an external memory. The security is carried out by a direct memory access controller integrated on the same chip as the microprocessor. The instructions and the commands are thus difficult to access for a malicious third party from inside the microprocessor where the data are in clear form. However, no means is available for guaranteeing that the data stored in the integrated memory are accessible only by the authorized processor operating in a particular mode. Therefore, it is still possible for a malicious third party to replace the content of the memory by an illegal content.

The document US2003/037220A1 discloses a memory management unit using a data addressing method by segments in which the stored data comprise a segment descriptor making the address mapping easier by eliminating a separated loader, but without solving problems related to security.

In the context of trusted computing platforms, it is important to ensure not only the authenticity of program instructions being executed by a target processor but also data which are used by the program instructions to execute particular actions. Solutions to the problem of the program instructions have been presented so far in the literature (refer to the publication "Caches and Merkle Trees for Efficient Memory Authentication"; Blaise Gassend, Dwaine Clarke, Marten van Dijk, Srinivas Devadas, Ed Suh). This approach suggests digitally signing and storing a list of page integrity figures (hashes) externally. A signed root hash is also stored externally but loaded to a memory management unit of the secure processor. In fact hash trees and caches are used to efficiently verify memory content. One drawback of the solution proposed in this publication is real applicability to data, because data is not static like program instructions could be, but it may vary during the execution of the program instructions. This publication does not discuss with appropriate details how the problem of preventing replay attacks is solved in a generic way, i.e. independently of the chosen integrity-providing primitive.

Therefore it would be desirable to extend the existing solutions in a way to include a new data protection mechanism consisting of verifying freshness of new data and supporting multi-thread with a same level of protection. Such a multi-thread mechanism allows concurrent application software creating their private protected data storage.

SUMMARY OF THE INVENTION

The invention aims to overcome the above mentioned drawbacks by applying a concept based on Merkle trees disclosed by document U.S. Pat. No. 4,309,569 for guaranteeing integrity of data pages by proposing a system and method to load and store data in a secure way by ensuring its freshness in a multi-thread environment.

A system according to claim 1 and a method according to claim 8 for processing digital data is disclosed. The system comprises at least one secure processor configured to perform data processing by using at least one untrusted external memory storing data to be processed, at least one secure internal cache memory to load or store data, and at least one secure cache translator operating as a memory management unit configured by a secure cache digest table stored in the secure internal cache memory.

A cache memory consists of a memory that stores temporally data coming from another data source in order to decrease data access time for a processor as well as in read or write mode. The cache memory is faster and located close to the processor but in general smaller than an external source memory for which the cache memory is used as an intermediary memory. The cache memory is often more expensive than a conventional memory because it is designed according to a more sophisticated technology in order to be as fast as possible to the detriment of its capacity. Being closely coupled to the secure processor, a cache memory is more easily made secure by physically restricting access rights to said processor and its memory management unit; so that the cache memory is considered as secure.

The external source memory (in general unsecure or untrusted) may be either local, such as a flash type memory, a hard disc, a SDR (Single Data Rate) or DDR (Double Data Rate) RAM Random Access Memory, or any type of read/write memory, or remote such as a cloud data store. A cloud is a concept consisting in transferring on distant servers data processing which might be alternatively be located on local servers or on a user unit. Cloud computing is a particular way of managing data as the location of the data is not known by the users or clients. The data are thus not recorded in a local computer but in a cloud made up of a certain number of distant servers interconnected by means of high bandwidth communication channels necessary for efficient system fluidity. The access to the cloud is usually achieved by using web-based applications using for example an Internet browser.

Data of secured applications or programs including program code and data to be processed are divided in persistent pages and non-persistent or variable pages having a size of 2 KB for example. The persistent pages such as constants cannot be altered at execution of the program while variable pages are generated during program execution. The system and method described herein ensure integrity of both persistent and variable data pages.

The secure cache digest table used in integrity verification of the pages contains, in addition to the process identifier and the root digest, at least a total number of data pages used in the process, a number of persistent data pages, an offset of the first page used to determine the address of the first page in the external memory and a flag indicating an access condition defining a mode according which the processor respectively the secure cache translator accesses to the data pages, i.e. read only (ro) mode or read/write (rw) mode. The root digest is obtained by applying a one-way and collision free cryptographically strong hash function on each data page according to a Merkle tree structure. The hash function may be of type SHA-2, SHA-3, BLAKE or of any other proprietary type.

When a page is loaded from the unsecure external memory to the secure internal cache memory or vice-versa, its integrity is verified by using the secure cache digest table previously stored in the secure internal cache memory. A persistent or a variable data page is thus validated only after a successful verification of its integrity, i.e. when its calculated digest respectively node digests or root digest of multiple pages is identical to a corresponding root digest extracted from the secure cache digest table.

The secure cache digest table is configured by the secure processor which loads the parameters and the digests of persistent pages while the digests of the variable pages are calculated during their processing and stored in the external memory. During the initialization phase, the secure cache translator or the secure processor, transfers the secure cache digest table from the external memory to the internal cache memory by carrying out a strong authentication based for example on a cryptographic algorithm using asymmetric cryptography as for example Digital Signature Algorithm or the like.

BRIEF DESCRIPTION OF THE DRAWINGS

The invention will be better understood with the following detailed description, which refers to the attached figures given as non-limitative examples.

DETAILED DESCRIPTION

Figure 1:
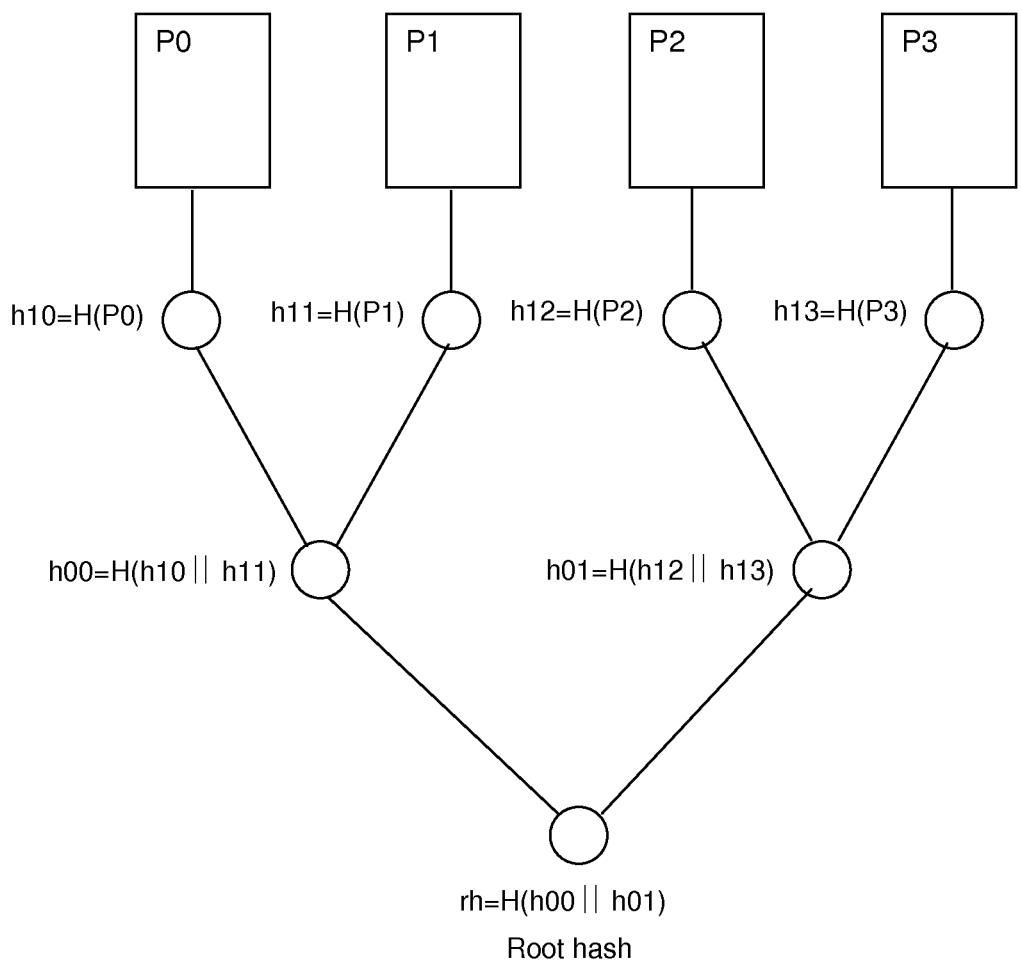
FIG. 1 shows an example of a Merkle tree structure applied on four data pages.

The integrity of data pages in a memory is verified with a hash tree also called a Merkle tree as in the example represented by FIG. 1. Each node contains a hash of the data that is in each one of the nodes that are above it. A root hash is stored in secure memory where it cannot be tampered with.

According to FIG. 1, four data pages P0, P1, P2, P3 are hashed individually to obtain respective nodes (node hashes) h10=H(P0), h11=H(P1), h12=H(P2), h13=H(P3). The first and the second node h10 and h11 are concatenated together and the result h10∥h11 re-hashed to obtain a further node h00=H(h10∥h11). In a similar way the third and the fourth node h12 and h13 are also concatenated together and the result h12∥h13 re-hashed to obtain the node h01=H(h12∥h13). Finally the hash of the concatenation of the nodes h00 and h01 gives the root hash rh=H(h00∥h01).

To check that a node in a hash tree has not been tampered with, a match of its hash is checked over a hash that is stored in its parent node, and that the parent node is checked in a similar manner. Repeating this process recursively, each node is thus checked up to the root hash of the tree. The calculated root hash value is checked against the value stored in the secure cache digest table (called secure hash table SHT in the examples) stored in the secure cache memory SCM. Similarly, a change to a data page requires that all the nodes between it and the root be updated. In a preferred embodiment, the node hashes are designated by an index determined by a routine in function of the number of pages p which is preferably a power of two ($p=2^n$), in order to use a binary tree structure. Therefore, the number of hashes $n_h$ to compute the root hash from a particular page is given by $n_h=\log_2(p)$. For example if $p=1024$, $\log_2(p)=10$, i.e. only 10 hashes are necessary to compute the root hash.

Figure 2:
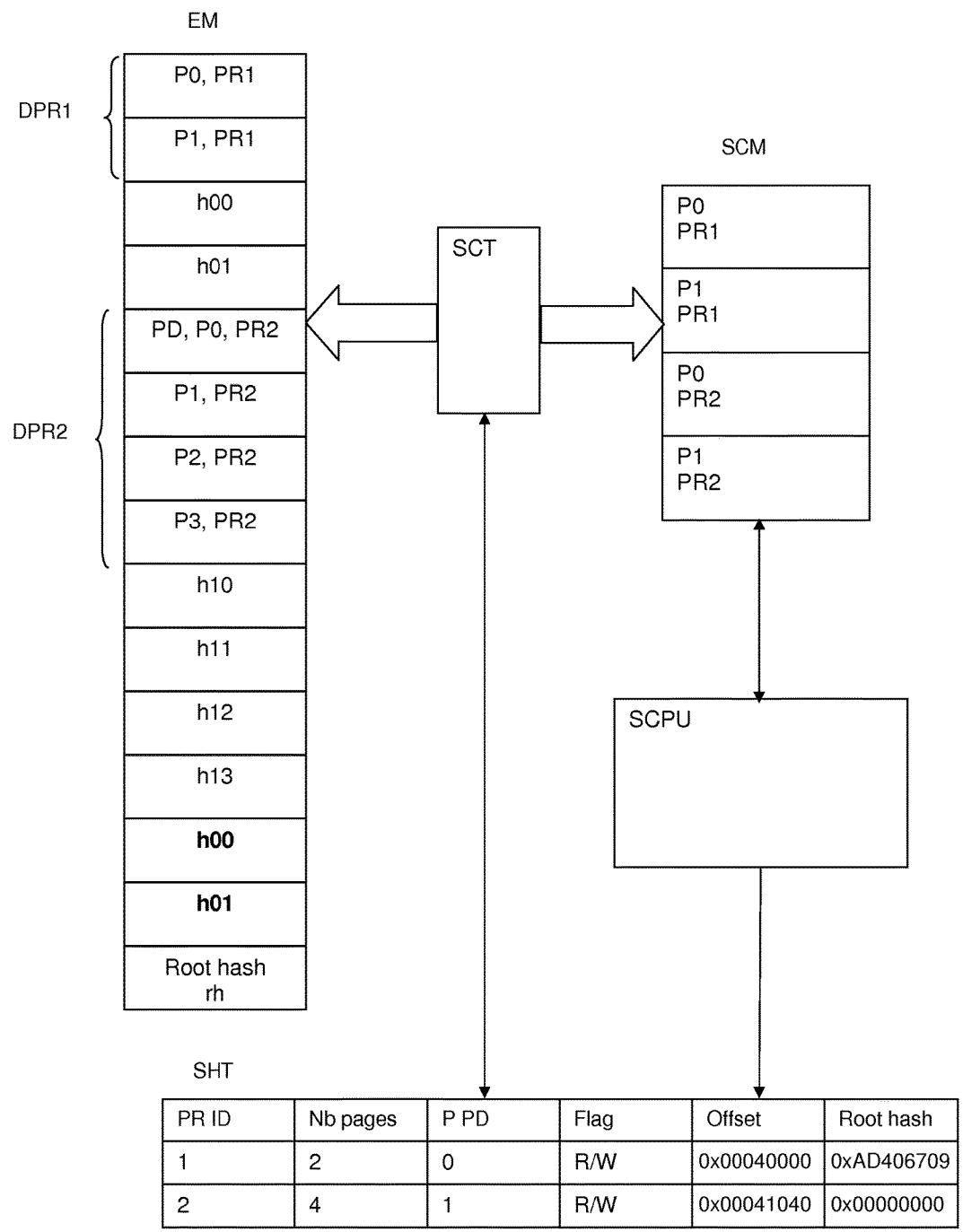
FIG. 2 shows an overview of the system according to the invention.

The system of the invention illustrated by FIG. 2 comprises a secure processor SCPU associated to an internal secure cache memory SCM and to an external untrusted memory EM. A secure cache translator SCT performs addresses translations and handles secure data exchanges between the external memory EM and the secure cache memory SCM by using a secure cache digest or hash table SHT. The secure cache translator SCT further performs computations of all the Merkle tree hashes, and also isolates the different process memories. The secure processor SCPU, the secure cache hash table SHT, the cache memory SCM and the secure cache translator SCT are considered as invulnerable i.e. data content, its behavior and states cannot be tampered with or observed. Contrarily, the external memory EM is considered as unsecure, i.e. stored data can be observed or modified by a third party.

In the system represented by FIG. 2, two processes PR1 and PR2 are running. The first process PR1 comprises only non persistent data distributed in pages P0 and P1. The external memory EM stores data pages P0 and P1 of the first process PR1 in the area DPR1, further memory space is reserved for the node hashes of the tree h00 and h01. Data pages P0, P1, P2 and P3 of the second process PR2 are stored in area DPR2, where the page P0 contains persistent data and the other pages are foreseen to contain variable data and space is reserved for the hashes h10, h11, h12, h13, h00, h01 and the root hash rh which is preferably signed. It has to be noted that the processes may contain more than two respectively four pages.

In an initialization phase and root hash authentication by verifying its signature, the secure processor SCPU executes a boot program for loading into the secure cache hash table SHT parameters related to each process PR1 and PR2. These parameters comprise a process identifier PR ID, a total number of the pages, a number of persistent pages, a flag F indicating the access mode to the pages (R/W for read/write in the example), an offset allowing finding the memory address of the first page of each process PR1 and PR2, and the root hash.

When a process having a given identifier ID contains persistent data, the secure cache translator SCT loads first the signed root hash. Once authenticated after a successful verification of the signature, the root hash is stored into the secure cache hash table SHT with the corresponding process ID. When the data pages are loaded into the secure cache memory SCM, the secure cache translator SCT calculates the node hashes of the tree to obtain a calculated root hash which is compared with the root hash stored in the secure cache hash table SHT. When the calculated root hash matches with the stored one, the data pages are considered as valid by the secure processor SCPU. In case of an unsuccessful comparison, the secure cache translator SCT may repeat root hash calculations a certain number of times and if errors still remain, the processor SCPU may block loading the data pages into the secure cache memory SCM.

Figure 3:
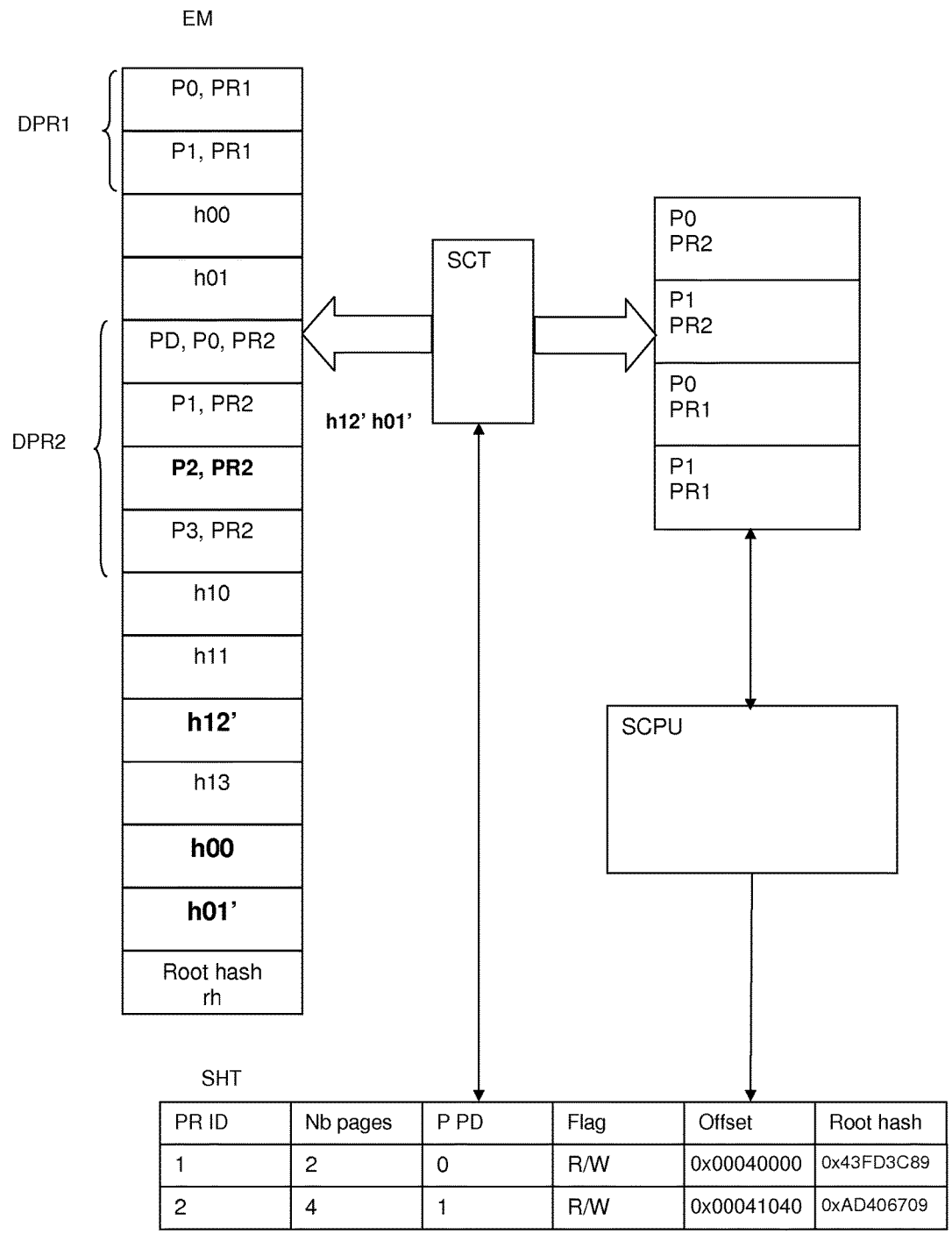
FIG. 3 shows a transfer of data pages from the external memory to the internal secure memory by verifying integrity of each data page with digests calculated on each data page according to a Merkle tree structure.

In this example of FIG. 3, the cache memory SCM has a capacity allowing loading only 4 pages. The system running during a certain period of time, the second process PR2 has already used 3 pages P0, P1, P2 in the cache memory SCM. Then the first process PR1 requires loading two pages P0 and P1. In order to load a supplementary page in the 4 pages cache memory, one page P2 of the second process PR2 previously processed has to be swapped out. Two cases may arise:

1): If a page of a process has to be transferred from the secure cache memory SCM to the external memory EM and if the root hash in the secure cache hash table SHT is zero, all the pages of this process are considered as zero pages. This case occurs only when a process has no persistent data pages. Therefore when a page has to be swapped out, the secure cache translator SCT computes the root hash and all the nodes h00, h01 of the tree of the first process PR1 according to the example.

The root hash is stored in the secure cache hash table SHT. By reading the offset present in the secure cache hash table SHT and by knowing the total number of pages, the nodes hashes are stored in the external memory EM and the page of the second process PR2 is also stored in the external memory EM.

2) In the example of FIG. 3, the second process PR2 contains one persistent data page P0, therefore the root hash is already stored in the secure cache hash table SHT during the initialization phase. It means that the hashes of the Merkle tree have already been computed. In that case, one page P2 of the process PR2 has to be swapped out. The secure cache translator SCT thus transfers from the external memory into the secure cache memory the nodes (h12, h13, h00) required to compute the root hash. The result is compared to the root hash stored in the secure cache hash table SHT. If the comparison is successful, the secure cache translator SCT computes the new root hash with the new hash h12' of page P2 and the modified node h01'. Due to the fact that data in the page has changed, some parts of the tree have to be re-computed. By using the node hashes previously transferred, all modified nodes of the tree can be obtained. In this example, two nodes have to be computed: h12' and h01'=H(h12'||h13)). This operation, of transferring first the nodes to compute the root hash, avoids an attacker replacing one page by an older one during the transfer of the nodes. In other words, it guarantees the freshness of the pages in the external memory EM.

Finally the new root hash is stored into the secure cache hash table SHT and page P2 is transferred into the external memory EM, see FIG. 3.

The above method describes the mechanism to transfer a page from the cache memory SCM to the external memory EM.

Following steps describe the transfer from the external memory EM to the cache memory. This transfer is called "swap in".

Figure 4:
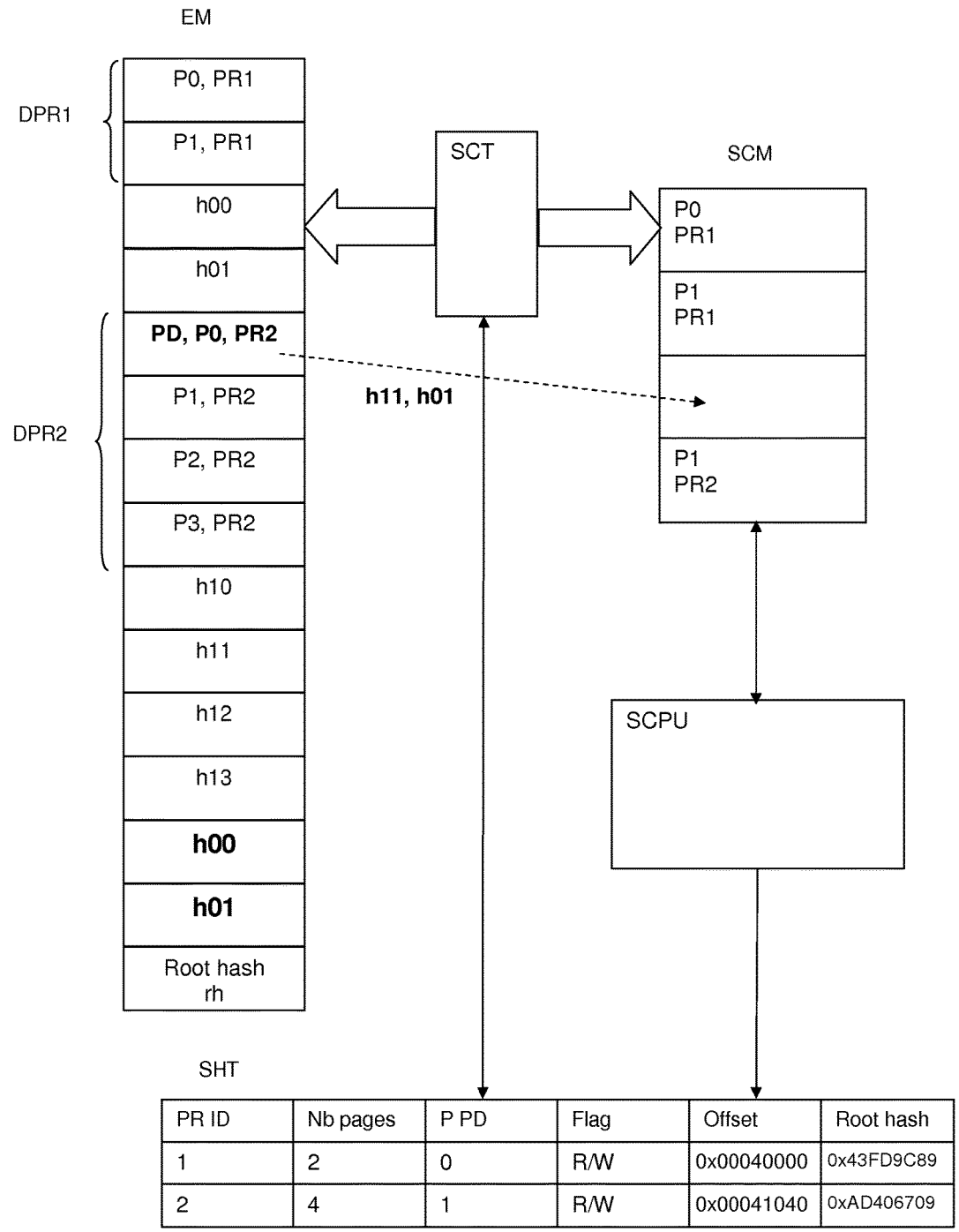
FIG. 4 shows a transfer of data pages from the secure internal memory to the external memory by verifying integrity of each data page with digests calculated on each data page according to a Merkle tree structure.

In the example of FIG. 4, the secure processor SCPU has to transfer page P0 of the second process PR2. Therefore the secure cache translator SCT transfers page P0 and its corresponding hashes h11 and h01 of the Merkle tree used to compute the root hash. The secure cache translator SCT computes thus the hash h10 of page P0 and with the already computed hashes h11 and h01, a new root hash can be computed. Then the obtained result is compared with the root hash stored in the secure cache hash table SHT.

If the comparison is successful, the secure cache translator SCT validates page P0 which can thus be used by the secure processor SCPU. It has to be noted the "swap out" and the "swap in" methods, as described above, may be applied as well as to code, i.e. program instructions and parameters, as to data used or produced by the program.

Figure 5:
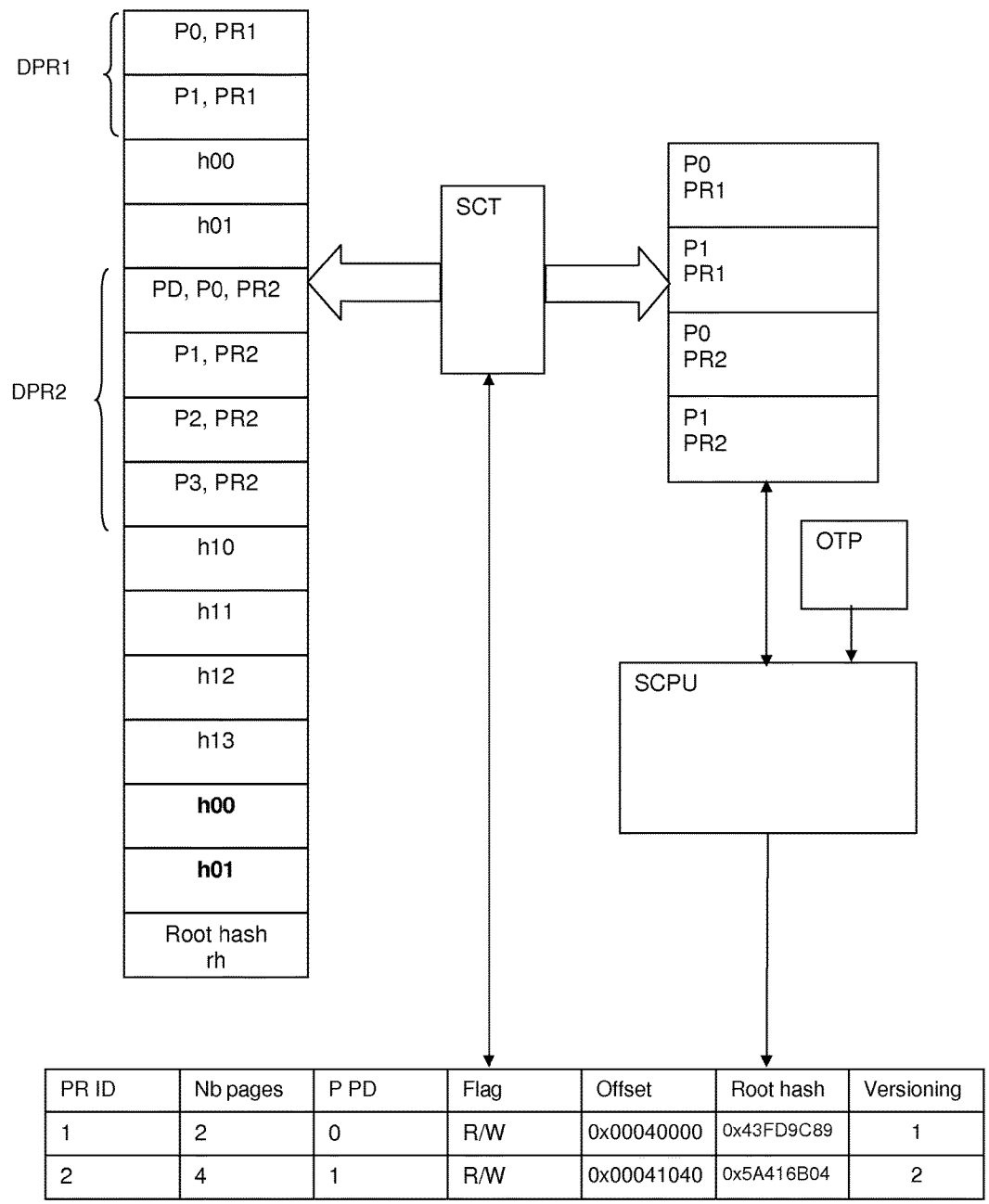
FIG. 5 shows an embodiment where freshness of persistent pages is verified by a versioning mechanism performed when data page are transferred from external memory to the internal secure memory and vice-versa.

In order to prevent replaying an old persistent data page, a versioning mechanism may be introduced during root hash computing. In this embodiment illustrated by FIG. 5, the secure processor SCPU is configured to access in a read/write mode to a monotonic counter generating a version reference value in a particular area of the memory storing the persistent data pages, as for example a One Time Programmable memory (OTP).

When the persistent page is loaded, the root hash and the versioning are thus verified. If the comparison gives a positive result, the root hash and the versioning (version reference value 1, 2 in the example of FIG. 5) are stored in the secure cache hash table SHT. The secure processor SCPU verifies that the value of the version reference in the secure cache hash table SHT is equal or higher than a corresponding value stored in the one time programmable memory OTP.

The invention claimed is:

1. A system for processing digital data comprising:
   at least one untrusted external memory for storing data to be processed;
   a one time programmable memory;
   at least one secure processor connected to the one time programmable memory and the at least one external memory and configured to perform data processing by using the at least one untrusted external memory;
   at least one secure internal cache memory connected to the at least one secure processor to load or store data; and
   at least one secure cache translator connected to the at least one secure internal cache memory and the at least one untrusted external memory operating as a memory management unit configured by a secure cache digest table stored in the secure internal cache memory:
   wherein the secure cache translator is configured to:
   a) store into the secure cache digest table, during an initialization phase, parameters related to current processes, the parameters, being arranged on persistent and variable data pages, comprise at least a process identifier and a root digest based on node digests calculated on at least one persistent data page according to a Merkle tree structure;
   b) verify integrity of data pages during transfer of data pages from the secure internal cache memory to the external memory, the verification being performed by comparing a calculated root digest of persistent pages stored in the external memory with a corresponding root digest stored in the secure cache digest table and in response to a successful comparison to calculate a new root digest with node digests of variable pages combined with node digests of persistent pages and to store the obtained new root digest in the secure cache digest table and into the external memory; and
   c) verify integrity of data pages during transfer of data pages from the external memory to the secure internal cache memory, the verification being performed by comparison of a calculated root digest of at least one page to transfer with a corresponding digest stored in the secure cache digest table and in response to the comparison being successful, allowing the page to be used by the secure processor;
   wherein a versioning mechanism is used during root digest calculating, the secure processor being configured to access in a read/write mode a monotonic counter generating a version reference value in the one time programmable memory, and to load a persistent data page by verifying, in addition to the root digest, that the version reference value stored in the secure cache digest table is equal or higher than a corresponding value stored in the one time programmable memory.

2. The system according to claim 1 wherein the root digest is obtained by applying a one-way, collision free cryptographically strong hash function on each data pages forming node hashes according to the Merkle tree structure, the hash function being of type SHA-2, SHA-3, BLAKE or of a any other proprietary type.

3. The system according to claim 1 wherein the secure cache digest table contains, in addition to the process identifier and the root digest, at least a total number of data pages used in the process, a number of persistent data pages, an offset of the first page used to determine the address of the first page in the external memory and a flag indicating an access condition defining a mode according which the processor respectively the secure cache translator accesses to the data pages.

4. The system according to claim 1 wherein the secure cache translator or the secure processor is further configured to transfer, during the initialization phase, the secure cache digest table from the external memory to the internal cache memory by carrying out a strong authentication based on a cryptographic algorithm using asymmetric cryptography.

5. The system according to claim 1 wherein the secure cache translator is further configured to perform repeated calculations in case of an unsuccessful comparison between a calculated root digest and the root digest stored in the secure cache digest table, the secure processor being configured to block loading the data pages into the secure cache memory if errors still remain.

6. The system according to claim 1 wherein the secure cache translator is configured to re-compute a new root digest by calculating node digests of modified data pages and to use previously calculated digests of persistent data pages previously stored in the external memory.

7. The system according to claim 1 wherein the untrusted external memory comprises either, a local memory, or a remote memory in form of a cloud data store.

8. A method for processing digital data by at least one secure processor configured to perform data processing by using at least one untrusted external memory storing data to be processed, at least one secure internal cache memory to load or store data, and at least one secure cache translator operating as a memory management unit configured by a secure cache digest table stored in the secure internal cache memory, the method comprising:
   a) during an initialization phase on request of the secure processor, storing, by the secure cache translator, into the secure cache digest table, parameters related to current processes, the parameters, being arranged on persistent and variable data pages, and comprising at least a process identifier and a root digest based on node digests calculated on at least one persistent data page according to a Merkle tree structure;
   b) during transfer of data pages from the secure internal cache memory to the external memory, verifying, by the secure cache translator, integrity of data pages by comparing a calculated root digest of persistent pages stored in the external memory with a corresponding root digest stored in the secure cache digest table and in response to a successful comparison, calculating a new root digest with node digests of variable pages combined with node digests of persistent pages and to store the obtained new root digest into the secure cache digest table and into the external memory; and
   c) during transfer of data pages from the external memory to the secure internal cache memory, verifying integrity of the data pages by performing a comparison of a calculated root digest of at least one page to be transferred with a corresponding digest stored in the secure cache digest table and in response to the comparison being successful, allowing use of the page by the secure processor;

wherein during root digest calculating, a versioning mechanism is used comprising accessing, by the secure processor, in a read/write mode, a monotonic counter generating a version reference value in a one time programmable memory, and loading a persistent data page by verifying, in addition to the root digest, that the version reference value stored in the secure cache digest table is equal or higher than a corresponding value stored in the one time programmable memory.

9. The method according to claim 8 wherein the root digest is obtained by applying a one-way, collision free cryptographically strong hash function on each data pages forming node hashes according to the Merkle tree structure, the hash function being of type SHA-2, SHA-3, BLAKE or of a any other proprietary type.

10. The method according to claim 8 wherein the secure cache digest table contains, in addition to the process identifier and the root digest, at least a total number of data pages used in the process, a number of persistent data pages, an offset of the first page used to determine the address of the first page in the external memory and a flag indicating an access condition defining a mode according which the processor respectively the secure cache translator accesses to the data pages.

11. The method according to claim 8 wherein the secure cache translator or the secure processor transfers, during the initialization phase, the secure cache digest table from the external memory to the internal cache memory by carrying out a strong authentication based on a cryptographic algorithm using asymmetric cryptography.

12. The method according to claim 8 wherein, in case of an unsuccessful comparison between a calculated root digest and the root digest stored in the secure cache digest table, the secure cache translator performs repeated calculations and if errors still remain, the secure processor blocks data pages loading into the secure cache memory.

13. The method according to claim 8 wherein the secure cache translator re-computes a new root digest by calculating node digests of modified data pages and using previously calculated digests of persistent data pages previously stored in the external memory.

* * * * *